United States Patent [19]

Bernhardt

[11] Patent Number: 5,402,983

[45] Date of Patent: Apr. 4, 1995

[54] COMBINED METAL AND PLASTIC DIAPHRAGM ASSEMBLY FOR A VALVE

[75] Inventor: Randy L. Bernhardt, Cincinnati, Ohio

[73] Assignee: Xomox Corporation, Cincinnati, Ohio

[21] Appl. No.: 196,521

[22] Filed: Feb. 15, 1994

Related U.S. Application Data

[63] Continuation of Ser. No. 113,840, Aug. 30, 1993, abandoned.

[51] Int. Cl.6 .............................................. F16K 5/02
[52] U.S. Cl. ..................... 251/309; 251/214
[58] Field of Search ................... 251/214, 309

[56] References Cited

U.S. PATENT DOCUMENTS

| | | |
|---|---|---|
| 3,425,439 | 2/1969 | Duffey et al. . |
| 3,565,394 | 12/1968 | Smith . |
| 3,597,820 | 8/1971 | Schenck, Jr. . |
| 3,603,341 | 9/1971 | Scaramucci . |
| 3,675,677 | 7/1972 | Scaramucci . |
| 3,703,910 | 11/1972 | Smith . |
| 3,771,764 | 11/1973 | Miyauchi . |
| 3,778,028 | 12/1973 | Graves et al. . |
| 3,825,030 | 7/1974 | Kalsi . |
| 4,259,980 | 4/1981 | Müller . |
| 4,317,558 | 3/1982 | Sherlaw . |
| 4,333,632 | 6/1982 | Smith . |
| 4,410,003 | 10/1983 | Sandling . |
| 4,462,568 | 7/1984 | Taylor et al. . |
| 4,475,712 | 10/1984 | DeJager . |
| 4,475,713 | 10/1984 | Reed et al. . |
| 4,512,586 | 4/1985 | Smith . |
| 4,513,770 | 4/1985 | Davy . |
| 4,516,597 | 5/1985 | Ueda . |
| 4,610,266 | 9/1986 | Sandling . |
| 4,617,957 | 10/1986 | Sandling . |
| 4,930,748 | 6/1990 | Gonsior . |

*Primary Examiner*—John C. Fox
*Attorney, Agent, or Firm*—Frost & Jacobs

[57] ABSTRACT

A sealing assembly for a valve with a rotary actuating shaft includes a top seal formed of a plastic diaphragm and a metal diaphragm, both of which are in sealing relationship with the actuating shaft. The metal diaphragm has a cantilever supported lip that is spring fitted into resiliently biased relationship with the actuating shaft. The sealing surface of the metal diaphragm provides a fire-tested seal in the event that the seal of the plastic seal is destroyed by fire.

8 Claims, 3 Drawing Sheets

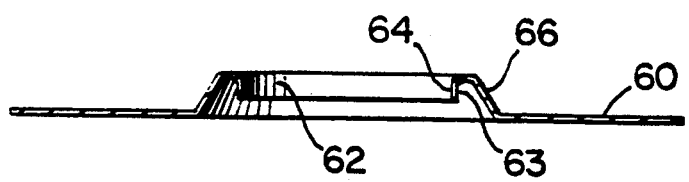
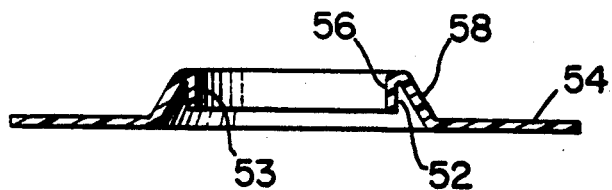
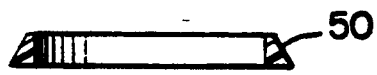
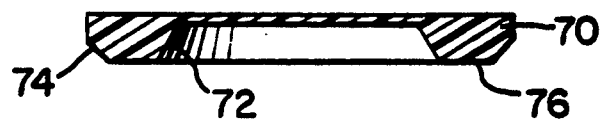

COMBINED METAL AND PLASTIC DIAPHRAGM ASSEMBLY FOR A VALVE

This is a continuation of application Ser. No. 08/113,840, filed Aug. 30, 1993, now abandoned.

TECHNICAL FIELD

The invention relates generally to valves and more particularly to a fire-tested sealing assembly for a rotary valve. The invention will be specifically disclosed in connection with a plug valve having a sealing assembly that includes both plastic and metal diaphragms.

BACKGROUND OF THE INVENTION

There is a long term and continuing effort to develop more effective seals for valves used to control the flow of corrosive fluids under high pressure. One of the more commonly used types of valves for this purpose is a plug valve. A plug valve has a fluid control member in the form of a plug which is rotatably fitted within the valve body. The plug of the valve is joined by an actuating shaft, which actuating shaft usually extends out of an access opening in the valve body to interact with an actuator. The actuator transmits torque through the actuating shaft to rotate the plug within the valve body and to selectively bring a passageway in the plug portion into and out of registry with a flow passage extending through the valve body. A valve cover having an opening for the actuating shaft is fitted over the access opening.

High performance plug valves used for high pressure corrosive fluids typically employ apertured sealing sleeves about the plug members. These apertured sleeves, which are apertured to permit fluid flow through the flow passage in the valve body, provide the primary seal against fluid leakage through the access opening. However, since some leakage past these sleeves sometimes occurs, it is common practice to provide additional seals, typically diaphragm seals, about the access opening and actuating shaft.

A number of different types of diaphragm seals have been used in the past to seal the area about the actuating shaft and the access opening. In one approach, a wedge ring, sometimes referred to as a delta ring, circumscribes the actuating shaft with an interference fit. A diaphragm with a central opening for the actuating shaft is then fitted about the stem in overlaying relationship to the delta ring. This type of arrangement is illustrated in U.S. Pat. No. 3,703,910.

Another successful access opening seal uses a diaphragm with a reverse lip which engages and extends along the actuating shaft's periphery. In this sealing arrangement, the opening in the diaphragm for the actuating shaft is in substantially perpendicular relationship to the outer and intermediate portions of the diaphragm.

Still another highly successful type of arrangement for sealing the actuating shaft opening of a rotary valve is disclosed in U.S. Pat. No. 4,333,632. In this sealing arrangement, a plug valve with an actuating shaft extending through the access opening has a sealing arrangement that includes a delta ring and the lip of a diaphragm. The diaphragm is formed with a hollow groove proximal to the actuating shaft, and the delta ring is placed in the hollow groove with an interference fit. The plastic diaphragm, usually formed from a fluorinated hydrocarbon material, is backed at its intermediate and radial outermost portions by a metal diaphragm which is partially fitted over the plastic diaphragm. The metal backup diaphragm functions to prevent excessive cold flow of the plastic diaphragm.

Due to the many difficulties of sealing metal surfaces against fluid leakage, including, adjoining, the non-pliant nature of metal and the varying dimensional changes that result from thermal expansion of various metal parts, such as relatively thin metal diaphragms and relatively massive valve actuating shafts, virtually all sealing arrangements for actuating shafts in valves designed for use under conditions of thermal cycling contact the actuating shaft with non-metallic materials. Indeed, all of the sealing surfaces that contact in the sealing arrangements discussed above are formed of plastic material, usually a fluorinated hydrocarbon polymeric material, such as polytetrafluoroethylene. Since such plastic materials disintegrate under the extreme heat conditions of a fire, alternative or supplemental fire-tested sealing arrangements must be used when the valve is used to control the flow of many highly flammable fluids. One such typical and commonly used supplemental sealing arrangement used to provide a supplemental fire-tested seal for the plastic diaphragm seals of the type discussed above is a flexible graphite stem seal cartridge. In this supplemental sealing arrangement, a flexible graphite sealing material is interposed between inner and outer thrust collars, and positioned in contacting relationship with the surface of the actuating shaft. These thrust collars are fitted onto a stamped metal diaphragm used to back up the radial outermost and intermediate portions of the plastic diaphragm. Thus, the metal diaphragm backs up the intermediate and radial outermost portions of the plastic diaphragm, and the thrust collars provide axial pressure back up for the circumferential area about the actuating shaft. The flexible graphite material is held in contacting relationship with the actuating shaft by the thrust collars, and the flexible graphite material is used to maintain a fluid seal against the actuating shaft in the event the plastic material used to seal about the actuating shaft is burnt away.

Due in part to the pliant nature of the flexible graphite material that is placed in contact with the actuating shaft, flexible graphite sealing cartridges have been proved to be successful supplemental fire-tested seals. Unfortunately, such cartridges add considerable complexity and cost to the sealing arrangement.

The non-metallic materials used to contact and seal against the actuating shaft are usually electrical insulators. Thus, it is necessary to use a static eliminator, a metal ring providing an electrical path between the actuating shaft and under body in order to avoid static buildup between these two parts of the valve.

SUMMARY OF THE INVENTION

Thus, it is an object of the present invention to provide a less complex, less expensive reliable fire-tested sealing arrangement for a valve having a rotary actuating shaft.

It is another object of the invention to provide a valve that provides a reliable fire-tested seal about an actuating shaft without the need for a flexible graphite stem seal cartridge.

Yet another object of the invention to provide a seal for the actuating shaft of a valve that provides a electrically conductive path between the valve body and the actuating shaft and eliminates the need for a grounding washer or a static eliminator.

Another object of the invention is to provide an improved seal for an actuating shaft of a rotary valve with improved cycle life.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention disclosed herein, a valve assembly including a valve body is provided with an inlet and a outlet and an internal flow passage extending therebetween. The valve includes a fluid control member movably disposed in the internal flow passage between the inlet and the outlet. The fluid control member is operative to control the flow of a process fluid through the valve body in accordance with the its position relative to said valve body. The valve body has an access opening for assembling and accessing said fluid control member. A valve cover encloses the access opening. An actuating shaft having a cylindrical surface extends axially outwardly from the fluid control member through the valve cover to a position outboard of the valve body. The outboard end of the actuating shaft is adapted to mechanically interface with a actuating element positioned external to said valve body for effectuating rotation of the fluid control member within the valve body. A sealing assembly surrounds the actuating shaft adjacent the access opening. The sealing assembly includes a metal diaphragm located intermediate of the valve cover and the fluid control member. The metal diaphragm extends from the valve body to the actuating shaft and provides an electrical path therebetween. The metal diaphragm has a central opening through which the actuating shaft extends and has a groove adjacent to and circumferentially surrounding the central opening. The groove has a first sidewall defining an axially extending cylindrical surface that is adjacent to and in contact with the cylindrical surface of the actuating shaft, and a second surface that obliquely oriented with respect to the first sidewall. The obliquely oriented sidewall is joined to the intermediate and radial outermost portions of the metal diaphragm, which are generally planar. The sealing assembly also includes a plastic diaphragm located intermediate of the metal diaphragm and the fluid control member. The plastic diaphragm is sealingly engaged with the periphery of the access opening and extends radially inwardly therefrom toward the actuating shaft. The plastic diaphragm has a central opening through which the actuating shaft extends with a groove adjacent to and circumferentially surrounding the central opening. The groove of the plastic sidewall has first and second sidewalls in generally parallel relationship to the respective first and second sidewalls of the metal diaphragm, the first sidewall of the plastic diaphragm defining an axially extending cylindrical surface adjacent to and in contact with the cylindrical surface of the actuating shaft. The configuration of the first and second surfaces of the groove in the plastic diaphragm are conformed to and partially contained within the groove of the metal sidewall.

In another aspect of the invention, the metal diaphragm located intermediate of the valve cover and the fluid control member. The metal diaphragm extends from the valve body to the actuating shaft and provides an electrical path therebetween. The metal diaphragm has a centrally disposed opening through which said actuating shaft extends and a cantilever supported lip forming a circumferential surface adjacent to and in resiliently biased contacting relationship with the actuating shaft. A plastic diaphragm having a centrally disposed aperture through which said actuating shaft extends also is provided. The plastic diaphragm is sealingly engaged with the periphery of the access opening and extends radially inwardly therefrom to the actuating shaft. The plastic diaphragm has a sealing surface adjacent to and circumferentially surrounding the central opening. The sealing surface of the plastic diaphragm is in contacting relationship with the actuating shaft.

BRIEF DESCRIPTION OF THE DRAWINGS

The accompanying drawings, incorporated in and forming a part of the specification, illustrate several aspects of the invention, and together with the description, serve to explain the principles of the invention. In the drawings:

FIG. 3 is an cross-sectional elevational view of the thrust collar of the valve of FIGS. 1-3;

FIG. 4 is a cross-sectional elevational view of the metal diaphragm of the valve of FIGS. 1-3;

FIG. 5 is a cross-sectional elevational view of the plastic diaphragm of the valve of FIGS. 1-3; and FIG. 6 is a cross-sectional elevational view of the wedge ring of the valve of FIGS. 1-3.

Reference will now be made in detail to the present preferred embodiment of the invention, an example of which is illustrated in the accompanying drawings.

DETAILED DESCRIPTION OF THE PREFERRED EMBODIMENT

Figure 1:
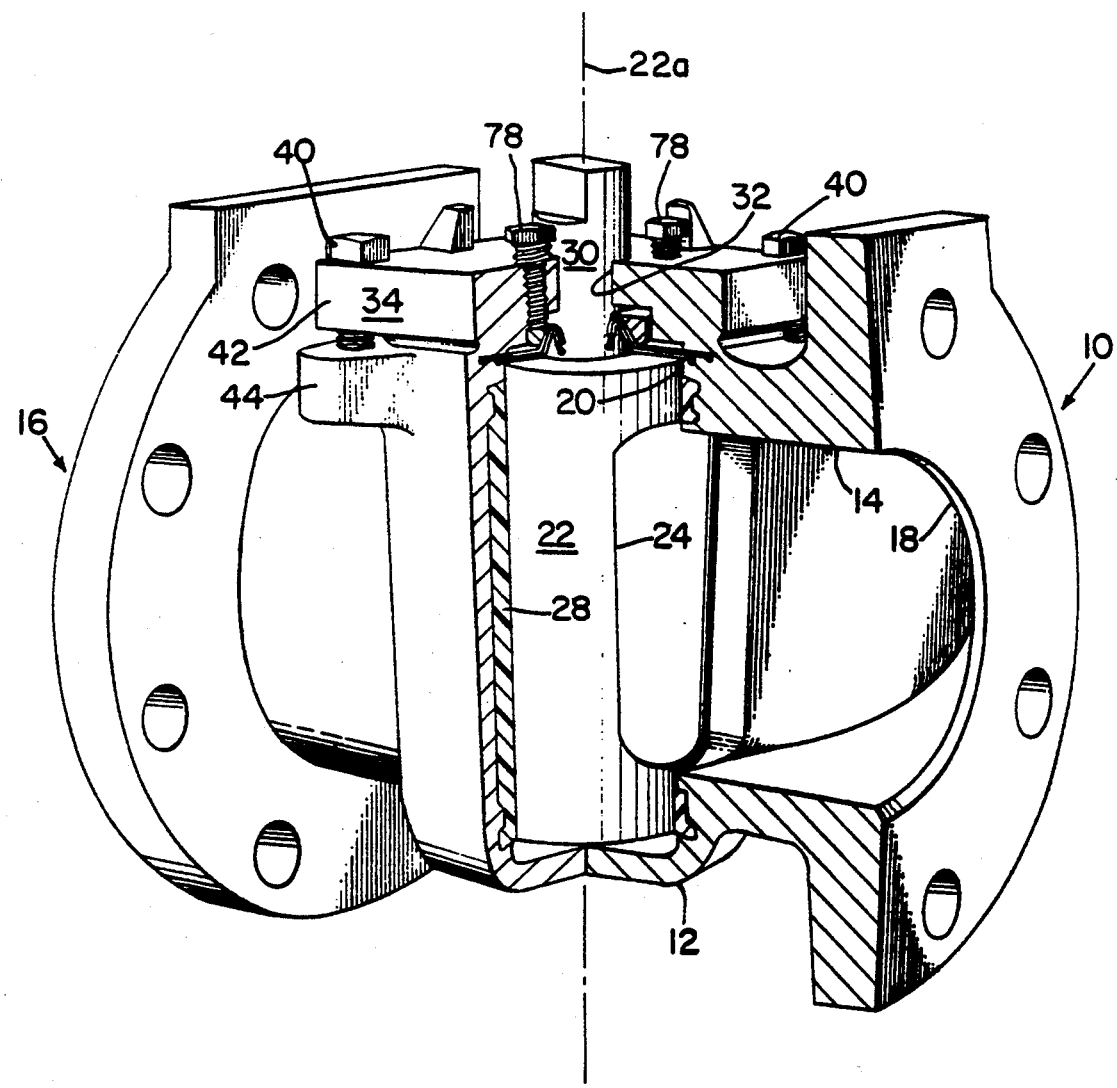
FIG. 1 is a perspective view of the valve of FIG. 1, partially in section, showing the novel seal arrangement of the present invention.

Referring initially to FIG. 1, a tapered plug valve generally designated by the numeral 10 is depicted. The valve 10 includes a valve body 12 having an internal flow passage 14 extending therethrough. The flow passage 14 spans the distance between an inlet 16 and an outlet 18. The valve body 12 has an access opening 20 intermediate the inlet 16 (particularly obscured in FIG. 1) and outlet 18. This access opening 20 provides access to a movable fluid control member 22, specifically illustrated as a tapered plug member in the illustrated embodiment. The plug member 22 is rotatably moved within the valve body 12 about an axis 22a to selectively block or otherwise control the flow of a process fluid through the internal flow passage 14. More particularly, the plug member 22 has a through passageway 24 which is selectively brought into and out of registry with the flow passage 14 in accordance with rotation of the fluid control member 22 with respect to the valve body 12. A sleeve 28 formed of plastic material, preferably a fluorinated hydrocarbon (such as polytetrafluoroethylene) or other material that is inert to the process media flowing through the passageway 14 is shown in the illustration interposed between the plug 22 and the valve body 12. The illustrated sleeve 28 is apertured in correspondence with the plug 22 so as to permit fluid flow through the plug passageway 24 whenever the plug passageway 24 is brought into registry with the flow passageway 14 extending through the valve body 12.

Rotational movement of the plug 22 is effectuated by an actuating shaft 30 that is rigidly affixed to the plug 22. The actuating shaft 30 extends through an aperture 32 (see FIG. 2) of a valve cover 34 for interconnection with an actuating mechanism (not shown) disposed external to the valve body 12. As will be apparent to those skilled in the art, the non-illustrated actuating mechanism applies a torque to the actuating shaft 30, which actuating shaft 30 transmits that torque to the plug member 22 to effect rotational movement of the plug member 22 within the valve body 12.

The valve cover 34 is removably secured to the valve body 12 by a plurality of bolts 40. The bolts 40 extend through aligned apertures (not shown) in correspondingly angularly spaced radially extending flanges 42 and 44 of the valve cover and valve body 12 respectively. In the illustrated valve 10, the apertures in the flanges 44 are threaded for threadably receiving the bolts 40, as is well known in the art.

The sleeve 28 provides the primary seal against the leakage of the process media out of the access opening 20. However, when the process media is under high pressure, some fluid leakage past the sleeve 28 may occur. Consequently, it is necessary to provide supplemental sealing in the area of the access opening 20. In the illustrated form of the invention, this supplemental sealing is provided by the sealing assembly depicted in FIGS. 2–6. This sealing assembly includes a V-shaped wedge ring 50 (seen in FIGS. 2 and 6) supported on a shoulder 23 of the plug 22. This wedge ring 50 is molded of polytetrafluoroethylene in the preferred embodiment.

The wedge ring 50 is partially received in a correspondingly shaped groove 52 (see FIG. 5) formed in a plastic diaphragm 54 (shown in FIGS. 2 and 5), also preferably formed of a fluorinated hydrocarbon material such as polytetrafluoroethylene. The V-shaped groove 52 of the plastic diaphragm surrounds a centrally disposed aperture 53 in the plastic diaphragm 54, which aperture 53 is sized to sealingly receive the actuating shaft 30. As more fully explained below, the V-shaped groove 52 of the plastic diaphragm 54 is defined by two sidewalls, a first sidewall 56, in the form of a downwardly depending lip, and a second sidewall 58 that is obliquely oriented with respect to the first sidewall 56. The first sidewall 56 defines a cylindrical surface that is adjacent to and (as explained below) in partial contact with the cylindrical surface of the actuating shaft 30. The wedge ring 50 has an interference fit with the sidewall 56, and applies a radially inward force against the sidewall 56, insuring effective sealing between the sidewall 56 and the actuating shaft 30. Other than the centrally disposed aperture 53 and the surrounding V-shaped groove 52 (defined by sidewalls 56 and 58), the remaining portions of the plastic diaphragm 54 are generally planar.

The top or outboard side of the plastic diaphragm 54 is covered by a metal diaphragm 60. In accordance with the principles of the present invention, the metal diaphragm 60 has an overall configuration that is somewhat similar to that of the plastic diaphragm 54. As best realized from jointly viewing FIGS. 1, 2 and 4, the metal diaphragm 60 has a centrally disposed aperture 62. Moreover, a V-shaped groove 63, formed by a radially inward sidewall 64 and a radially outward sidewall 66, circumscribes the centrally disposed aperture 62. The sidewall 64 is in the form of a downwardly depending lip that is initially formed so as to form an aperture 62 having a dimension slightly smaller than that of the actuating shaft 30, and at a slight angle with respect to the axis 22a. However, the sidewall 64 is spring press fitted against the actuating shaft 30, and resiliently stretched radially. When so fitted, the actuating shaft 30 resiliently urges the sidewall 64 to a position in which the sidewall 64 defines a generally cylindrical surface in sealing relationship to the actuating shaft. The sidewall 66 is obliquely oriented with respect to both the sidewall 64 and the remaining radially outward portions of the metal diaphragm 60. The outer periphery of the metal diaphragm 60 is sealed against the valve body 12 by a flexible graphite seal 68, as shown in FIG. 2.

As shown in the illustrated embodiment, the sidewall 64 has a dimension in the axial direction that is substantially less than the corresponding axial dimension of the sidewall 66. (In the specifically illustrated embodiment, the axial dimension of the sidewall 64 is approximately one third that of the sidewall 66.) Like the plastic diaphragm 54, the portions of the metal diaphragm 60 located radially outwardly of the V-shaped groove 62 are generally planar.

Figure 2:
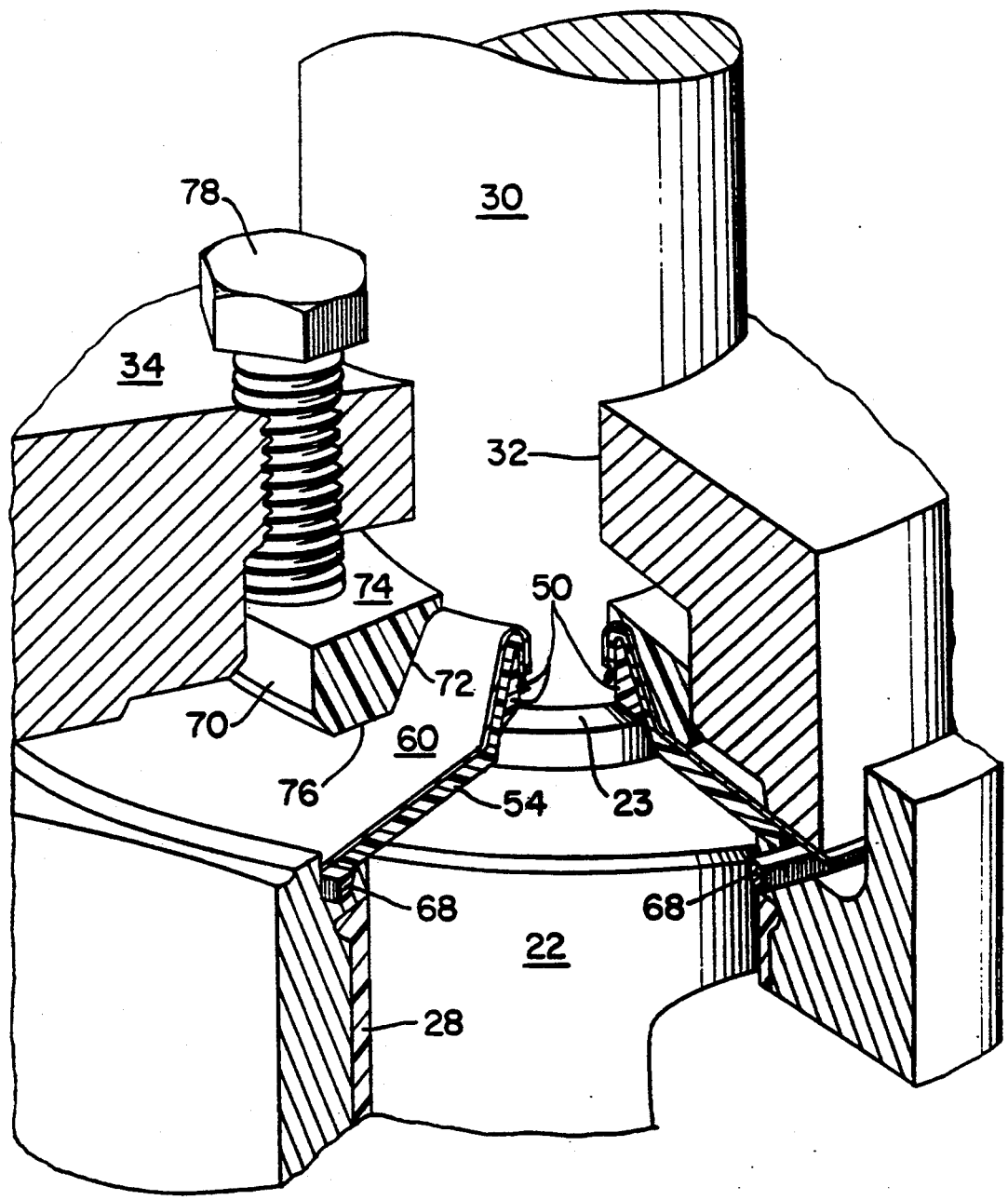
FIG. 2 is an enlarged perspective view of the top seal area of the valve of FIG. 1.

As shown in FIGS. 1 and 2, the sidewalls 64 and 66 defining the V-shaped groove 63 in the metal diaphragm 60 have a size and angular configuration that matches the size and angular configuration of the sidewalls 56 and 58 forming the V-shaped groove 52 in the plastic diaphragm 54. Thus, the metal diaphragm 60 is fitted over the plastic diaphragm 54, and the axially outward sides of the sidewalls 56 and 58 are in contacting relationship with the axially inward sides of sidewalls 64 and 66 respectively. Significantly, however, the axial dimension of the sidewall 56 exceeds the corresponding axial dimension of the sidewall 64 so that both the sidewall 64 and a portion of the sidewall 56 are in contacting relationship with the cylindrical surface of the actuating shaft 30.

The configuration of the respective V-shaped grooves 52 and 63 in the plastic and metal grooves respectively enables effective sealing between the actuating shaft and both of the sidewalls 56 and 64. The interference fit of the wedge ring 50, coupled with the shape memory that is formed into the plastic material of the diaphragm 54 insures that the sidewall 56 will sealingly engage the actuating shaft 30. Further, the spring press fit of the metal sidewall 64 against the surface of the actuating shaft 30 resiliently biases the sidewall 64 into sealing relationship with the shaft 30, even during conditions of thermally induced dimensional change between the actuating shaft and the metal diaphragm 60.

Referring now to FIGS. 2 and 3, it is seen that a thrust collar 70 with an obliquely oriented interior circumferential surface 72 is adjustably urged against the similarly angled sidewall 66 of the metal diaphragm 60 to apply a sealing force thereto. The thrust collar 70 also includes upper and lower planar surfaces 74 and 76, respectively. The upper surface 74 receives adjustably pressure from a plurality of adjusting screws 78 (see FIGS. 1 and 2). The lower surface 76 contacts the intermediate planar portion of the metal diaphragm 60 and applies axial pressure thereto.

In summary, numerous benefits have been described which result from employing the concepts of the invention. By providing the metal diaphragm with a cantilevered lip that is spring fitted against the shaft, the metal diaphragm provides a pliant metal sealing surface that maintains a fluid sealing relationship with an actuating shaft even under conditions of thermally induced dimensional changes of the valve components. The metal diaphragm of the invention thus provides an effective fire-tested seal without the need for the cost and complexity of flexible graphite stem cartridges. Sealing the surface of an actuating shaft with a resiliently biased lip of a metal diaphragm also avoids substantially increasing the torque requirements of the valve. Furthermore, since the metal diaphragm of the invention provides a continuous electrical path between the valve body and the actuating shaft, the invention eliminates the need for static eliminators. Moreover, since the diaphragm of the invention provides improved backup of the plastic surfaces of the plastic diaphragm, the invention improves the cycle life of the top sealing arrangement.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable on of ordinary skill in the art to best utilize the invention in various embodiments and with various modifications as are suited to the particular use contemplated. It is intended that the scope of the invention be defined by the claims appended hereto.

What is claimed is:

1. A valve assembly, comprising:
  a) a valve body, said having an inlet and a outlet and an internal flow passage extending therebetween;
  b) a fluid control member movably disposed in the internal flow passage between the inlet and the outlet, said fluid control member being operative to control the flow of a process fluid through said valve body in accordance with the its position relative to said valve body, said valve body having an access opening for assembling and accessing said fluid control member;
  c) an actuating shaft interconnected with said fluid control member, said actuating shaft having a cylindrical surface that extends axially outwardly from the fluid control member to a position outboard of the valve body, the outboard end of said actuating shaft being adapted to mechanically interface with a actuating element positioned external to said valve body for effectuating rotation of the fluid control member within said valve body;
  d) a valve cover for enclosing the access opening, said actuating shaft extending through the valve cover; and
  e) a sealing assembly surrounding the actuating shaft adjacent the access opening, said sealing assembly including:
    i) a metal diaphragm located intermediate of the valve cover and the fluid control member, the metal diaphragm extending from the valve body to the actuating shaft and providing an electrical path therebetween, said metal diaphragm having a central opening through which said actuating shaft extends with a groove adjacent to and circumferentially surrounding the central opening, the groove having a first sidewall defining an axially extending cylindrical surface adjacent to and in contact with the cylindrical surface of the actuating shaft, and a second sidewall obliquely oriented with respect to the first sidewall; and
    ii) a plastic diaphragm located intermediate of the metal diaphragm and the fluid control member, said plastic diaphragm being sealingly engaged with the periphery of the access opening and extending radially inwardly therefrom toward the actuating shall, said plastic diaphragm having a central opening through which said actuating shaft extends with a groove adjacent to and circumferentially surrounding the central opening, the groove of the plastic diaphragm having first and second sidewalls in generally parallel relationship to the respective first and second sidewalls of the metal diaphragm, the first sidewall of the plastic diaphragm defining an axially extending cylindrical surface adjacent to and in contact with the cylindrical surface of the actuating shaft, the configuration of the first and second sidewalls of the groove in the plastic diaphragm being conformed to and partially contained within the groove of the metal diaphragm.

2. A valve assembly as recited in claim 1 further including a wedge ring disposed in the groove of the plastic diaphragm.

3. A valve assembly as recited in claim 2 wherein the plastic material is a fluorinated hydrocarbon polymeric material.

4. A valve assembly as recited in claim 3 wherein the plastic material is polytetrafluoroethylene.

5. A valve assembly as recited in claim 1 wherein the first sidewall of the groove in the metal diaphragm is a cantilevered supported lip that is resiliently biased against the actuating shaft.

6. A valve assembly as recited in claim 5 wherein the first sidewall of the groove in the metal diaphragm is spring fitted against the actuating shaft.

7. A valve assembly as recited in claim 5 wherein the first sidewall of the groove in the metal diaphragm has a dimension in the axial direction that is substantially less than the dimension of the first sidewall of the plastic diaphragm in the corresponding direction.

8. A valve assembly, comprising:
  a) a valve body, said having an inlet and a outlet and an internal flow passage extending therebetween;
  b) a fluid control member movably disposed in the internal flow passage between the inlet and the outlet, said fluid control member being operative to control the flow of a process fluid through said valve body in accordance with its position relative to said valve body, said valve body having an access opening for assembling and accessing said fluid control member;
  c) an actuating shaft interconnected with said fluid control member, said actuating shaft having a cylindrical surface that extends axially outwardly from the fluid control member to a position outboard of the valve body, the outboard end of said actuating shaft being adapted to mechanically interface with an actuating element positioned external to said valve body for effectuating rotation of the fluid control member within said valve body;
  d) a valve cover for enclosing the access opening, said actuating shaft extending through the valve cover; and e) a sealing assembly surrounding the actuating shaft adjacent the access opening, said sealing assembly including:

i) a metal diaphragm located intermediate of the valve cover and the fluid control member, the metal diaphragm extending from the valve body to the actuating shaft and providing an electrical path therebetween, said metal diaphragm having a central opening through which said actuating shaft extends and a cantilever supported lip forming a circumferential surface adjacent to and in resiliently biased contacting relationship with the actuating shaft; and ii) a plastic diaphragm having a centrally disposed aperture through which said actuating shaft extends, said plastic diaphragm being sealingly engaged with the periphery of the access opening and extending radially inwardly therefrom to the actuating shaft, said plastic diaphragm having a sealing surface adjacent to and circumferentially surrounding the central opening, said sealing surface of the plastic diaphragm being in contacting relationship with the actuating shaft.

* * * * *

UNITED STATES PATENT AND TRADEMARK OFFICE
CERTIFICATE OF CORRECTION

PATENT NO. : 5,402,983
DATED : April 4, 1995
INVENTOR(S) : Randy L. Bernhardt

It is certified that error appears in the above-indentified patent and that said Letters Patent is hereby corrected as shown below:

Column 8, line 9 (claim 1), delete "shall" and insert in place thereof --shaft--.

Signed and Sealed this

Twenty-fourth Day of October, 1995

Attest:

BRUCE LEHMAN

Attesting Officer

Commissioner of Patents and Trademarks